Oct. 19, 1971     H. JÄGER     3,613,156
PRESSURE CASTING MACHINE
Filed Sept. 23, 1969
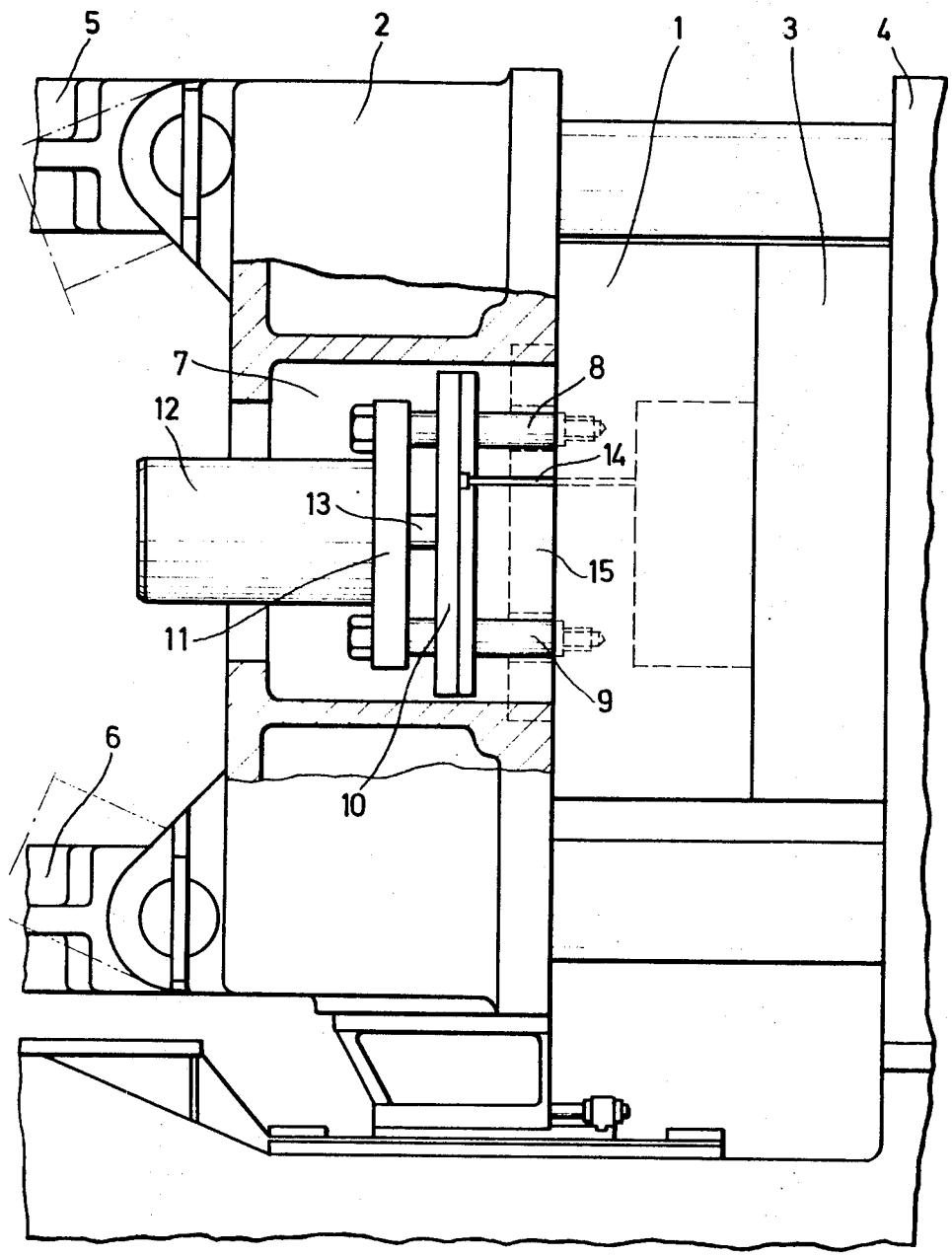
INVENTOR.
Heinz Jäger
BY
Watson, Cole, Grindle & Watson
Attys.

United States Patent Office 3,613,156
Patented Oct. 19, 1971

3,613,156
PRESSURE CASTING MACHINE
Heinz Jäger, Braunschweig, Germany, assignor to Volkswagenwerk Akt., Wolfsburg, Germany
Filed Sept. 23, 1969, Ser. No. 860,273
Int. Cl. B29f 1/14
U.S. Cl. 18—2 RM                              1 Claim

ABSTRACT OF THE DISCLOSURE

Pressure casting machine having a movable frame and an ejector plate with ejectors guided along columns together with a hydraulic shifting arrangement as a hydraulic cylinder for the ejector plate.

---

This invention relates to a pressure casting machine.

Castings produced with the pressure casting method must be ejected because of their shrinkage in the pressure casting mold. For that purpose two ejecting devices cooperate, one of which must be developed by the designing engineer for molds and the other by the designing engineer for machines. Functionally the ejection installations which are joined in series are connected by a so-called ejector spike or several ejector bars.

On the reverse side of the half of the ejector mold there is normally provided a tension box which houses the movable ejector plate with the rod-shaped ejectors attached thereto, as well as the guide columns for the ejector plate. The construction of these parts is a part of the duty of the designing engineer for the mold.

The machine ejector installation customarily consists of an ejector table with hydraulic cylinders as well as of coupling means for the ejector spike.

The known construction has a series of disadvantages. Since the height of the tension box is determined by the ejector stroke, it can amount up to 50% of the entire movable mold half, and it causes as a result thereof, a strong top-heaviness of the movable half of the mold. As a result thereof, a constant shifting of the ejector mold in relation to the half of the sprue mold develops and thus a shifting of the inside contour in relation to the outside contour of the casting. As a result thereof, the top-heaviness of the movable half of the mold increases the stress on the four machine columns on which the movable frame slides. This disadvantage cannot be avoided simply by guides for the support of the movable half of the mold.

An ejector spike must normally be arranged precisely in the center of gravity of the sum of all forces occurring as a result of the ejectors. The precise installation at the place of operation however is made difficult by the poor accessibility to the ejector spike coupling on the pushing side, so that the danger of a tilting of the mold ejector plate is likely and thus a snapping or tearing off of the ejectors and a breaking off of the ejector spike might take place.

This invention strives to avoid the previously mentioned drawbacks while at the same time achieve a lowering of constructional costs.

It is therefore an object of the invention to hollow out a space in the movable frame required for the shifting of the ejector plate and to house the ejector plate together with its guide columns in said space, as well as to couple the hydraulic cylinder with the elimination of an ejector spike directly to the ejector plate. The hollowing out of the frame thus incorporates the complete ejector installation of the mold. The movable frame is reconstructed in such a manner as to be sufficiently strong in accommodating the stress or load which may be encountered.

No disadvantages arise in hollowing out the movable frame because the middle part of said frame is normally not under stress. In order to balance the contact pressure between the mold and the frame, which may have been possibly decreased as a result of the larger recess in the case of extremely small molds, a laid-in plate supporting the movable half mold may be inserted into the movable frame.

The ejecting cylinder may be manufactured once for each machine and the ejector may be coupled with the ejector plate at its center of gravity and so that it will always be precisely centered.

The invention is to be explained in the succeeding paragraphs on the basis of a design given by way of example.

Further objects will be apparent from the following description when considered in connection with the accompanying drawing which is a vertical cross-section showing a horizontal cold chamber pressure casting machine shown diagrammatically and partially, it being noted that those constructional parts which are not essential in describing the invention have been omitted. As shown in the drawing the movable half of the mold or ejector half of the mold 1 is moved in this case in a known manner against the fixed sprue half 3 of the mold and the fixed frame 4 by means of the movable frame 2 by way of the knee levers 5 and 6, indicated only partially.

According to the invention a space 7 has been hollowed out in the movable frame 2. The guide columns 8 and 9 for the ejector plate 10 are located on the ejector half 1 of the mold and these columns 8 and 9 at the same time hold a carrying plate 11 for a hydraulic cylinder 12. The piston rod 13 of the cylinder 12 has been coupled to the center of gravity of the system of ejectors 14 (only one shown) with the ejector plate 10. It is to be noted that for higher ejector pressures it may be desirable to use two cylinders.

A laid-in or inverting plate 15 as shown in broken lines in the figure, serves to balance the contact pressure between the mold 1 and the frame 2 which may have been decreased with the provision of a larger recess in the case of extremely small molds. Frame 15 therefore serves to support the movable half of mold 1 by the recess 7 and between the mold plate and the frame can be balanced, which however will be necessary only in the case of very small molds.

The installation according to the invention thus consists of considerably fewer parts as compared to known installations also, the mold tension boxes, the ejector spike and the adjustable coupling means to the hydraulic cylinders, connected with said pipe, are eliminated. Furthermore, a considerable saving in the overall length of the construction will result and also it is of advantage that the entire ejector installation can be assembled completely outside the machine. The hollowing out of a fairly large space in the movable frame does not give rise to difficulties insofar as the former tension box did not support the ejector half of the mold in this area.

By elimination of the ejector spike the tilting of the ejector plate of the mold and thus the snapping or tearing off of the ejectors will be largely avoided. The entire ejector arrangement now is located as a part belonging to the mold in the redesigned movable frame and does not require additional headroom. By elimination of the mold tension boxes the ejector half of the mold is no longer top-heavy and can be centered more easily with the sprue half of the mold. Furthermore, the weight of the mold and the mold box is decreased and the construction of the ejector installation now will be the duty of the designing engineer for molds alone.

I claim:
1. A die casting machine having a movable machine frame with an ejector portion for a mold being supported by said machine within its peripheral area, said ejector portion being movable by a hydraulic cylinder and piston rod, said movable frame being provided with an axial recess extending therethrough for accommodating an ejector arrangement, said arrangement including an ejector plate having ejectors secured thereto and further including guide columns along which said ejector plate is moved by means of said piston rod, an inserting plate mounted to close one side of the recess facing said ejector portion, said inserting plate being provided with bores for accommodating said guide columns and said ejectors during penetrating movement therethrough.

References Cited

UNITED STATES PATENTS

| | | | |
|---|---|---|---|
| 2,783,501 | 3/1957 | Kutik | 18—2 (RP) |
| 3,049,758 | 8/1962 | Drevalas | 18—2 (RP) X |
| 3,197,825 | 8/1965 | Hammond | 18—2 (RP) X |
| 3,418,684 | 12/1968 | Collins | 18—2 (RP) |
| 3,448,488 | 6/1969 | Kiraly | 18—2 (RP) |

ROBERT L. SPICER, Jr., Primary Examiner